United States Patent [19]
Davidson

[11] Patent Number: 4,461,596
[45] Date of Patent: Jul. 24, 1984

[54] ARRANGEMENT FOR FRAME AND THE LIKE

[76] Inventor: Mats I. Davidson, Djupakal, 502 78 Gånghester, Sweden

[21] Appl. No.: 380,675
[22] PCT Filed: Sep. 17, 1981
[86] PCT No.: PCT/SE81/00269
    § 371 Date: May 7, 1982
    § 102(e) Date: May 7, 1982
[87] PCT Pub. No.: WO82/01054
    PCT Pub. Date: Apr. 1, 1982

[30] Foreign Application Priority Data

Sep. 17, 1980 [SE] Sweden .............................. 8006509

[51] Int. Cl.³ .......................... B25G 3/00; F16B 7/08
[52] U.S. Cl. ...................................... 403/231; 403/187
[58] Field of Search ................... 403/187, 11, 170–172, 403/174, 176–178, 189–191, 231

[56] References Cited

U.S. PATENT DOCUMENTS 3,966,342 6/1976 Moriya ............................ 403/297 X
3,969,031 7/1976 Kroopp ........................... 403/189 X
4,142,343 3/1979 Trafton ............................ 256/59 X Primary Examiner—Andrew V. Kundrat

[57] ABSTRACT

Arrangement for frames and the like which are composed of distance elements, for example in the form of tubular struts and holding devices which keep these together in the form of coupling nodes (1), each of which comprises an initial inner portion (7) which is arranged to be clamped in a cavity in one of the elements, and the second outer portion (6) which is arranged to hold a second element by clamping firmly around this by means of outer contact surfaces (16). The coupling nodes (1) consist of two components (2, 2) which are located on either side of a center plane and furthermore there are for example screw devices for displacing these components in relation to each other. By this means the said clamping can be obtained during which the contact surfaces (16) move towards each other. On either side the cavity in the first-mentioned element exhibits surfaces which face away from each other. The first portion (7) of the sections has contact surfaces (21) on the same side of the center plane as the said contact surfaces (16). When the sections are displaced and during movement of the first-mentioned contact surfaces (16) towards each other, the contact surfaces (21) of the first inner section (7) are also moved towards each other and thereby make contact with the contact surfaces in the cavity.

8 Claims, 7 Drawing Figures

Fig. 2
Fig. 1
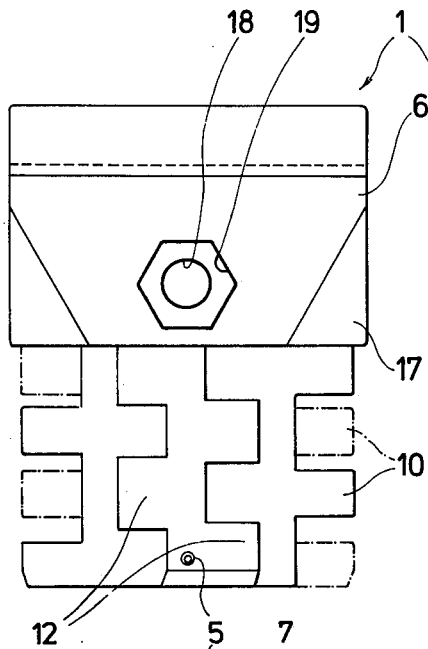
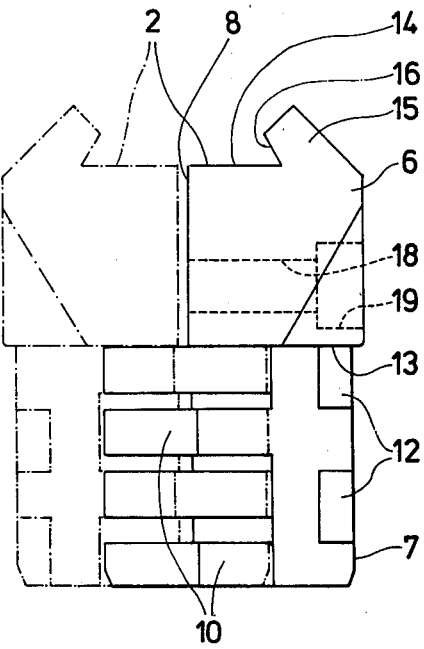
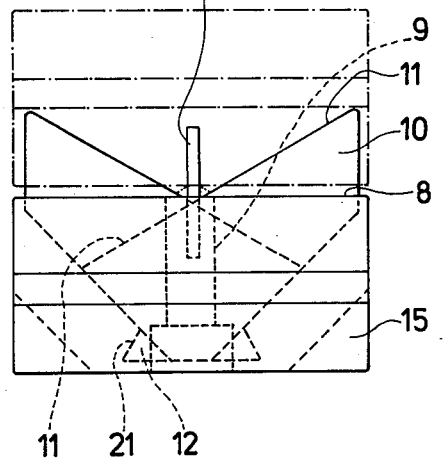
Fig. 3

ARRANGEMENT FOR FRAME AND THE LIKE

BACKGROUND

The method is already known for constructing frames and frame-like arrangements with the aid of tubular struts and coupling nodes. The present invention relates to an arrangement for this purpose and comprises struts in the form of tubular elements and coupling nodes which are designed to be inserted from the end of one tube element, for joining this with another similar tube element along its side at right angles to its longitudinal axis and in several rotational postions. Such an arrangement is already known from Swedish patent specification 7312307-7. Here the tube elements are four-sided and possess a number of grooves along their sides. The leg ends of a U-shaped coupling element can be pushed into two such grooves and gripped firmly by clamping around the opposite walls of the two grooves which face each other by means of a screw. The coupling element is held in postion in such a way at a tube element and joins this with another tube element at right angles thereto in that the coupling element is inserted in the end apperture of the second tube element and is held firmly at the element because the said screw extends through a hole in the latter.

TECHNICAL PROBLEM

With such an arrangement the clamping effect is relatively good at the first tube element if the legs of the coupling element are made sufficiently strong, but the connection to the second tube element takes place without any tightening-up facility and only by virtue of the fact that the hole of the tube element is, in a manner of speaking, mounted on the ends of the screw. As a result the coupling cannot accommodate any great forces and in the event of vibrations and similar periodic forces there is likely to be considerable risk of ever increasing play occurring at the point of connection.

THE SOLUTION

The problem is solved by a coupling node in which the coupling element is fitted to both tube elements in the same tightening operation.

ADVANTAGES

The object of the present invention is to bring about an arrangement which facilitates the connection of identical tube elements by means of coupling nodes in an extremely stable manner so that high static and dynamic forces can be accommodated.

Another objective of the invention is to bring about an arrangement with a coupling node which can be executed in a simple manner using rational methods and with restricted tool costs.

BRIEF DESCRIPTION OF DRAWINGS

The attached drawings show two embodiments of the arrangements which will be described in the following.

FIG. 1 is a side view of the coupling node in accordance with the first embodiment;

FIG. 2 provides a second side view, seen at right angles to the direction of observation employed in FIG. 1;

FIG. 3 provides an end view, seen from the right in FIG. 2;

BEST WAY OF CARRYING OUT THE INVENTION

Figure 5:
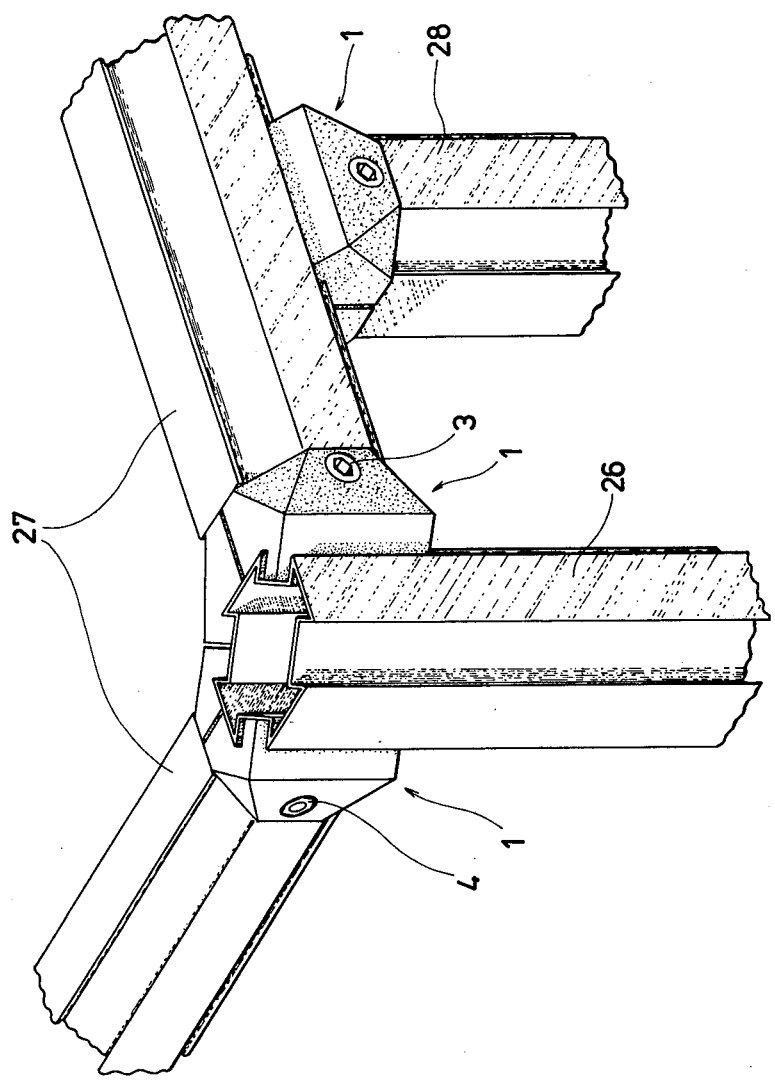
FIG. 5 shows in perspective three coupling nodes which interconnect four tube elements.

According to the diagrams a complete coupling node 1 comprises two identical node halves 2 (in FIGS. 1-3 one half is illustrated by continuous lines and one half by dot-dashed lines), a screw 3 with internal hexagon socket and a nut 4 (3 and 4 are illustrated in FIG. 5). Each node half has an outer portion 6 and an inner portion 7. The outer portion 6 comprises an inward-facing surface 8 which is designed to face towards the other node half when two halves are placed together to form a complete coupling node.

Figure 4:
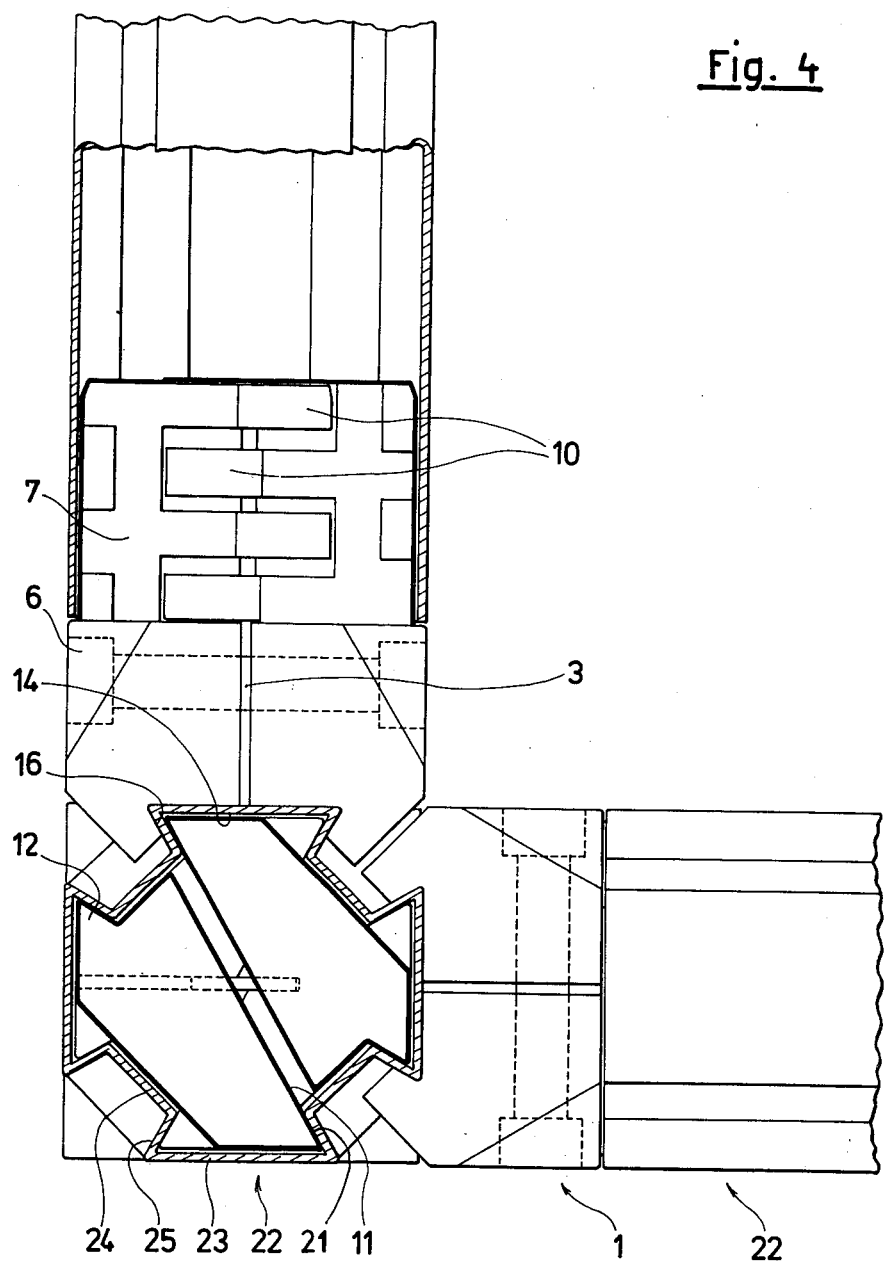
FIG. 4 illustrates a partly broken view of three coupling nodes and three connected tube elements.

As already mentioned the coupling nodes are designed to join two tube elements and one such node is illustrated in transverse section to the bottom, right in FIG. 4. The tube elements are designated as 22 and consist of a thin-wall profile which can be inscribed in an imaginary square. Outer sides 23 of the profile proceed along the sides of the square, whilst in the centre of the corner of the imaginary square grooves are formed by folding in the walls in such a way that the bottoms of the respective grooves are formed by a wall section 24 which forms an angle of 45° to the outer sides 23. The sides of the grooves are formed by sections 25, which join the wall sections 23 and 24, and which exhibit an angle of 60° in relation to the respective outer sides 23. Thus the wall sections 23 together with the surroundin sections 25 form four dovetail-like sections.

Since the tube elements are to interact with the coupling nodes, in that the inner sections 7 of the latter are inserted in the ends of the tube elements, whilst at the same time the outer sections 6 must be capable of being joined along the tube profiles as a result of interaction between surfaces on the coupling nodes and the wall sections 23 and 24 on the tube profiles, it is advisable that the latter be provided with the same profile along their entire length. If however, other elements are to be connected at any point there is no objection to the tube profile having a different configuration from the profile shown in certain longitudinal sections, provided that this configuration does not affect the intended connection of a coupling node.

In the coupling node 1 the outer portion 6 of the two halves 2 must grip around the dovetail-shaped sections of the tube element 22 and rest against two opposing surfaces 25. The outer portion 6 can be regarded as forming a parallelepipedic block having a side 13 from which the inner portion 7 proceeds. A projection 15 having a contact surface 16 which extends outwards from surface 14 and which is obliquely directed towards the inner surface 8 extends from one outer end surface 14. The surface 14 is at right angles to the inner surface 8 and in the embodiment shown the contact surface 16 forms an angle of 60° to the end surface 14. With a complete coupling node the opposite surfaces 16 of the two halves form the gripping surfaces which are in the manner described, will surround the said dovetail-shaped section of the tube element formed by two surfaces of the walls 25. At the surface 13 the outer portion 6 possesses corner chamfers 17.

In the centre plane and through the outer portion 6 a hole 18 extends for screw 3, which is terminated by a recess 19 either for the circular head of screw 3 or for the hexagonal nut 4.

The inner portions 7 of the halves which have been placed together to form a coupling node are designed to be introduced into the end of the tube element and clamped here at the same time as the surface 16 of the outer portion clamps another tube element. By this means the tube element, in the ends of which the portions 7 have been inserted, can be fixed at right angles to a second tube element, on which the outer portion of the coupling node has been clamped, which can be done anywhere along the length of this tube element.

The inner portion 7 has four ledge-shaped projections 10. The outer ends of these projections each form a surface 11 which is directed essentially in the same direction as the internal surface 8, but oblique to this. The surfaces 11 are located above the surface 8 (viewed in the direction of the surface 8). The portion of each alternate projection 10 which projects above the surface 8, and the surface 11, face one long edge of the node half 2 and alternate projections face towards the other side edge. Thus the surfaces 11 form a zig-zag in relation to each other. The projection 10 also has oblique faces 21 which are located on the opposite side (viewed in the direction at right angles to the inner surface 8) of the projection in relation to the respective surface 11. The surfaces 21 are formed on small shoulders 12. The projections 10 are joined by a centre portion 9.

As mentioned, the projections 10 are arranged one after another in zig-zag along the longitudinal axis of the node half 2 and can thus be said to form four laminations which are angled with respect to each other. In this connection the longitudinal connection of the node half is regarded as being in the direction of an imaginary plane which extends at right angles to the inner surface 8 and centrally through the outer portion 6 and comprises a plane of symmetry to the latter, and further centrally through the inner portion 7. In the following this plane is designated as the centre plane.

The angle between the surfaces 11 of the projections 10 is equal to the angle of the wall 25 and in the embodiment shown is 120°. The remaining surfaces of the projections 10 are shown most clearly in FIG. 4 where, at the bottom right, an end view is given of a coupling node from that end at which the inner portion is located. As indicated by this diagram there are also surfaces 21 on the shoulders 12 which in the embodiment shown form 30° to the respective surface 11. The remaining surfaces are not intended to make any contact but are free surfaces and hence can be given a freer shape as will be indicated by the following.

FIGS. 1–3 illustrate a node half 2, by continuous lines, whilst the dot-dashed lines show how a second node half of identical shape can be placed in the centre against the first half and form a coupling node with the two inner surfaces 8 facing each other and surrounding a centre plane between the portions.

As a result of the displacement of the projections 10, when the node halves face each other these fit against each other so that the respective surfaces 11 face each other as is shown furthest to the right in FIG. 4. Here the projections 10 engage in each other in laminar fashion, see the centre of FIG. 4, whereby care has been taken to provide adequate play between these projections. The node halves are designed to be held together by screw 3, and this extends through the hole 18, its head being located in a recess 19 in one node half, whilst a nut 4 is located in the recess 19 in the other node half. A pin 5 is designed to control the position of the coupling nodes during assembly and preferably the holes for the pin in the two node halves are somewhat different in diameter, so that the pin can be fastened in one node half and proceed with some play into the second node half. However with completely different node halves this can be arranged by employing a pin with two successive diameters.

The two coupling node halves 2 can be identical, but can even so be paired together with their surfaces 8 facing each other by the said displacement of the projections 10 which then engage with each other. At the same time the node half is so designed that it does not have any undercut portions, when viewed in a parting plane parallel with the surface 8. This means the node halves lend themselves to casting, e.g. die casting, this makes them easy to produce in spite of their complicated shape. Only one die for one node half is required to produce the complete coupling nodes.

Figure 6:
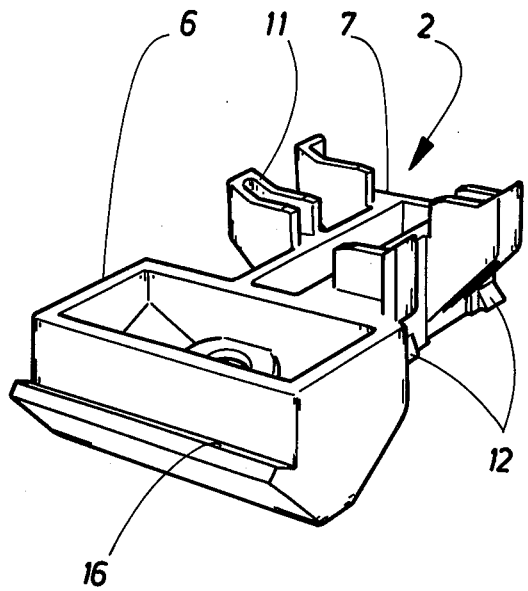
FIGS. 6 and 7 show perspective views of the coupling nodes in the second embodiment.
Figure 7:
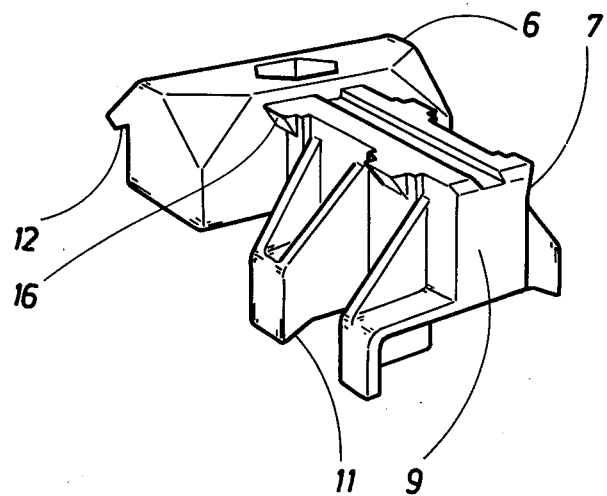

The same properties are exhibited by the coupling node half shown in FIG. 6. Like the node half shown on the embodiment described previously, this has the same contact surfaces 16, 11 and 21. However it has been adapted to an even higher degree to die casting in that as shown in the diagram it exhibits recesses which give a relatively thin and essentially uniform material thickness. Since the contact surfaces are as mentioned essentially the same, the function too is the same.

When connecting two tube elements 22 together, two node halves are taken which are placed together in the manner shown by way of example in FIG. 1 and their inner portions 7, are inserted in one end of a tube element. The surface 16 of the outer portion 6 is hooked over one of the dovetail-shaped portions on the second tube element. These portions are formed, as mentioned, by the wall sections 23 and 25. By tightening the screw 3 it is possible to make the surfaces 16 clamp around the sections 25, whereby as a result of their oblique position, at the same time surfaces 14 are forced against the wall section 23 and a firm grip is obtained. During tightening at the same time the inner section 7 of the two node halves 2 are pressed against each other. During this process initally the surfaces 21 on the projecting shoulders 12 are pressed against the inner walls of a total of four of the wall sections 25. The surfaces 11 should preferably exhibit some play in respect of their opposite wall sections 25. As tightening progresses a certain amount of resilience is obtained in the tube profile which also results in the surfaces 11 making contact. Contact takes place for both node halves and at two positions for each projection 10 and thus over a total of 16 positions for the coupling node, these contact points—as a result of the rotation of the various projections 10 in relation to each other, are symmetrically distributed around the centre plane. FIG. 4 best illustrates how clamping is best undertaken.

It should be noted that the clamping of the outer section 6 against the tube profile is undertaken in that the surfaces 16 are brought towards each other and thus grip firmly around the tube element. The surfaces 21 are also brought close together and as a result press against the outward-facing inner surfaces of the tube element. On the other hand the surfaces 11 of the projection 10 are located on the other side of the centre plane, they are "in herring bone fashion" in relation to each other, and as a result they become further apart as the node halves are drawn together and thus make contact with the inward-facing (facing towards the centre plane) surfaces inside the tube element. Thanks to this intricate principle the said circular tube profile obtains well-distributed contact.

INDUSTRIAL APPLICABILITY

Thanks to the embodiment of the components of the arrangement described and illustrated here, merely by tightening a screw extremely strong and robust clamping of the tube elements is obtained by means of coupling nodes which provides dispersed, well-distributed contact surfaces and above all clamping which prevents movement between the component and thus eliminates the risk of deformation and play. The system ensures that the end of a tube element can always be connected to an intersecting tube element, anywhere along its length and in four directions which are at right angles to each other. As shown in FIG. 5, with the aid of these connection facilities it is possible to construct an infinite variety of structures. Thus a framework for a machine, a conveyor or an exhibition showcase can for example be constructed with an outer corner with one vertical tube element 26 (FIG. 5) and two horizontal tube elements 27 which connect at rightangles to each other. Transverse struts 28 can be inserted at any point along the profiles 26 and 27. The dovetail-shaped sections formed by the tube elements are also highly suitable for the attachment of different components, e.g. by means of clamping devices, similar to those formed by the outer portion 6 of the coupling node. The principle of the inner component 7 of the coupling node can also be exploited for special items such as feet, which are inserted from the bottom into a vertical tube element, also for joint pieces for joining two tube elements in line with each other and designed as two connected inner components.

As mentioned the node halves 2 should preferably be designed in the form of die-cast sections, whereby the fact that the node halves are identical is advantageous both from the tooling and manufacturing viewpoint, also for reasons connected with storage and assembly. Naturally other manufacturing methods are also feasible and in this connection it should be borne in mind that the only position where the node halves require any precision is at the contact surfaces against the tube elements, i.e. the surfaces 11, 21 and 16.

The tube elements can be designed as extruded profiles, but in the case of steel which cannot be extruded, it is also easy to manufacture them by bending from a different plate in a roll bending machine. This means that there is a wide range of material and manufacturing methods available for manufacturing purposes.

I claim:

1. An assembly comprising: at least two tubular structural elements, and a coupling for holding said elements together, said coupling including a first, inner portion arranged to be clamped in a cavity in one element, and a second, outer portion arranged to grip the second element by clamping firmly around said second element by means of outer contact surfaces on the coupling, the coupling comprising two sections, each section being provided with a head portion forming part of said outer portion and respectively located to one side of a center plane between the sections, the head portions supporting said contact surfaces; said coupling also compring tightening means for mutually displacing said sections so as to achieve said clamping and thereby move said contact surfaces towards each other perpendicular to said center plane, said cavity in the first structural member being provided with pairs of surfaces which are directed away from each other and located on either side of the center plane, said first inner portion being provided with inner contact surfaces on opposite sides of the center plane to be brought in contact with the pairs of contact surfaces in said cavity which face away from each other, so that a displacement of the sections by said tightening means results in movement of said inner and outer contact surfaces to a contact with corresponding contact surfaces of the cavity of the one structural element and with the other structural element, respectively.

2. An assembly according to claim 1, in which said contact surfaces of the cavity are formed of folded-in wall sections of the element which, at least in the area of the cavity, has the form of a tube with essentially uniform material thickness.

3. An assembly according to claim 2, in which said outer contact surfaces of said second element are formed of folded-in wall sections at the outside of the element forming adjacent inwardly directed portions carrying said contact surfaces.

4. An assembly according to claim 1, in which the cavity also has surfaces which face each other and which are arranged for the contact of contact surfaces of a second type on the coupling sections which are located on the opposite side of the center plane in relation to the previously mentioned contact surfaces, whereby on displacing the previously mentioned contact surfaces towards each other the latter-mentioned, second type contact surfaces are moved away from each other, and thereby make contact with the surfaces in the cavity which face each other, whereby the position of all the internal contact surfaces is such that they essentially make contact simultaneously.

5. An assembly according to claim 1 in which the two sections of the coupling have their inner contact surfaces located on projections which follow one after the other along a longitudinal axis of the element, and which when the element halves are placed together engage each other in a laminar fashion.

6. An assembly according to claim 4, in which each section has at least two projections, each of which, if the sections are divided into imaginary quadrants of said center plane and a second plane which extends thereto at right angles, have a contact surface of the first mentioned type in one quadrant and a contact surface of the second type in a quadrant which is diagonally opposite thereto.

7. An assembly according to claim 6, in which the projections for each section are so sub-divided by pairs that at least one projection has contact surfaces in a first pair of diagonally opposite quadrants, and at least a second projection has contact surfaces in the remaining pair of opposite quadrants.

8. An assembly according to claim 5, in which the two sections of the coupling are equal, and the projections are staggered in such a way that when the two identical portions are turned towards each other the respective projections in one portion can be fitted in the cavity between the projections to the other portion, and vice versa.

* * * * *